US012653093B2

(12) United States Patent
Brox et al.

(10) Patent No.: US 12,653,093 B2
(45) Date of Patent: *Jun. 16, 2026

(54) CUTTING UNIT WITH DOUBLE KNIFE SYSTEM AND MOVABLE SLIDING SURFACE

(71) Applicant: Carl Geringhoff GmbH & Co. Kommanditgesellschaft, Ahlen (DE)

(72) Inventors: Christian Brox, Ascheberg (DE); Dirk Webermann, Senden (DE); Steffen Sudhues, Ahlen (DE); Michael Pokriefke, Hude (DE)

(73) Assignee: CARL GERINGHOFF GMBH & CO. KOMMANDITGESELLSCHAFT, Ahlen (DE)

( * ) Notice: Subject to any disclaimer, the term of this patent is extended or adjusted under 35 U.S.C. 154(b) by 462 days.

This patent is subject to a terminal disclaimer.

(21) Appl. No.: 18/319,991

(22) Filed: May 18, 2023

(65) Prior Publication Data

US 2023/0371425 A1     Nov. 23, 2023

(30) Foreign Application Priority Data

May 20, 2022     (DE) .......................... 102022112817.2

(51) Int. Cl.
*A01D 34/14*          (2006.01)
*A01D 34/135*        (2006.01)
(Continued)

(52) U.S. Cl.
CPC ......... *A01D 34/145* (2013.01); *A01D 34/135* (2013.01); *A01D 34/30* (2013.01);
(Continued)

(58) Field of Classification Search
CPC ........ A01D 34/04; A01D 34/34; A01D 34/32; A01D 34/145; A01D 34/135; A01D 34/33; A01D 34/30; A01D 57/26
See application file for complete search history.

(56) References Cited

U.S. PATENT DOCUMENTS 6,962,040 B2 * 11/2005 Talbot .................. A01D 34/135
                                                              56/297
7,478,522 B1 * 1/2009 Lovett .................... A01D 41/14
                                                              56/296

(Continued)

FOREIGN PATENT DOCUMENTS

DE        4041802 C1     2/1992
DE        19826289 C1     2/2000
(Continued)

*Primary Examiner* — Adam J Behrens
(74) *Attorney, Agent, or Firm* — Kevin M. Kercher; Practus, LLP

(57)                    ABSTRACT

In order to reduce crop losses in the region of the knife bar, a double knife cutting system (11) includes a first part of the knife blades (18 *a*) present on the cutting unit (2) are fastened to a first knife back (20 *a*), this first part of the knife blades (18 *a*) together with the first knife back (20 *a*) forming the upper knife (22), a second part of the knife blades (18 *b*) present on the cutting unit (2) being fastened to a second knife back (20 *b*), this second part of the knife blades (18 *b*) together with the second knife back (20 *b*) forming the lower knife (24), the upper knife (22) and the lower knife (24) being driven in opposite directions, and, of the drive rocker arms (34), a first drive rocker arm (34) being drive-connected to the upper knife (22) and a second drive rocker arm (34) being drive-connected to the lower knife (24).

13 Claims, 5 Drawing Sheets

(51) Int. Cl.
    *A01D 34/30*         (2006.01)
    *A01D 34/33*         (2006.01)
    *A01D 57/26*         (2006.01)
    *A01D 34/04*         (2006.01)

(52) U.S. Cl.
    CPC ............. *A01D 34/33* (2013.01); *A01D 57/26*
         (2013.01); *A01D 34/04* (2013.01)

(56)           References Cited

U.S. PATENT DOCUMENTS

| | | | | |
|---|---|---|---|---|
| 8,347,594 | B1 * | 1/2013 | Lovett | A01D 41/14 |
| | | | | 56/257 |
| 9,192,097 | B2 * | 11/2015 | Cook | A01D 34/30 |
| 9,699,959 | B2 * | 7/2017 | Wilbert | A01D 34/003 |
| 10,212,884 | B2 * | 2/2019 | Webermann | A01D 43/06 |
| 10,433,479 | B2 * | 10/2019 | Honey | F16H 37/124 |
| 10,820,496 | B2 | 11/2020 | Cook | |
| 10,827,673 | B2 * | 11/2020 | Cook | A01D 34/305 |
| 11,419,270 | B2 * | 8/2022 | Figgins | A01D 61/02 |
| 2007/0204586 | A1 * | 9/2007 | Coers | A01D 34/30 |
| | | | | 56/16.9 |
| 2009/0199529 | A1 | 8/2009 | Schroeder | |
| 2011/0078989 | A1 * | 4/2011 | Bich | A01D 34/30 |
| | | | | 56/14.5 |
| 2014/0130472 | A1 * | 5/2014 | Cook | A01D 34/30 |
| | | | | 56/16.4 R |
| 2014/0215991 | A1 * | 8/2014 | Brimeyer | A01D 41/142 |
| | | | | 56/14.7 |
| 2015/0305233 | A1 * | 10/2015 | Surmann | A01D 34/14 |
| | | | | 56/10.1 |
| 2017/0105344 | A1 * | 4/2017 | Webermann | A01D 43/06 |
| 2018/0103580 | A1 * | 4/2018 | Neely | A01D 34/33 |
| 2018/0192581 | A1 * | 7/2018 | Cook | A01D 34/145 |
| 2019/0104676 | A1 * | 4/2019 | Cook | A01D 41/14 |
| 2019/0124830 | A1 * | 5/2019 | DeChristopher | A01D 34/44 |
| 2019/0124832 | A1 * | 5/2019 | DeChristopher | A01D 34/30 |
| 2019/0191625 | A1 * | 6/2019 | Cook | A01D 34/145 |
| 2019/0357438 | A1 * | 11/2019 | Zumbach | A01D 34/38 |
| 2019/0373807 | A1 * | 12/2019 | DeChristopher | A01D 34/14 |

FOREIGN PATENT DOCUMENTS

| | | | | |
|---|---|---|---|---|
| DE | 10246558 | A1 | 4/2003 | |
| DE | 102011016618 | A1 | 10/2012 | |
| DE | 102015110746 | A1 | 1/2017 | |
| DE | 102018119326 | B3 | 1/2020 | |
| EP | 2148559 | B1 | 12/2010 | |
| EP | 2570017 | A1 * | 3/2013 | ........... A01D 34/135 |
| EP | 3637978 | B1 | 1/2021 | |
| EP | 3881664 | A1 | 9/2021 | |
| WO | WO-2019010567 | A1 * | 1/2019 | ............. A01D 34/30 |

* cited by examiner

CUTTING UNIT WITH DOUBLE KNIFE SYSTEM AND MOVABLE SLIDING SURFACE

CROSS REFERENCE TO RELATED APPLICATIONS

This application claims priority under 35 U.S.C. § 119 to German Patent Application DE 10 2022 112 817.2, filed May 20, 2022, which is herein incorporated by reference in its entirety, including without limitation, the specification, claims, and abstract, as well as any figures, tables, appendices, or drawings thereof.

FIELD OF THE INVENTION

The present invention relates to a cutting unit for attachment to a combine harvester.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

A cutting unit of the generic type is known from document DE 10 2015 116 890 A1. A Draper cutting unit is disclosed therein, the depositing surface of which is configured on the respective upwardly pointing side of a plurality of belt conveyors which are driven in circulation.

The cutting unit is provided with a knife bar on which stationary knife blades which are mounted on the knife bar interact with knife blades which are attached to a lifting rod which is arranged transversely with respect to the working direction of the cutting unit and is driven movably so as to oscillate in the direction of extent. This is a simple cutting system. The mechanism, by way of which the lifting rods are driven, is positioned at least approximately centrally with respect to the working width of the cutting unit. The output shafts, which are guided out of the mechanism housing to the outside on the upper side of the mechanism, transmit the drive power to rocker arms which are connected fixedly to the respective output shafts for conjoint rotation and, in each case, drive a lifting rod in an oscillating manner. The lifting rods extend, however, only in each case over half the working width of the cutting unit.

It has been shown that grain losses occur on the cutting unit of the generic type in difficult harvesting conditions. As a result of the contact of the stalks and/or infructescences of the harvested crops with parts of the cutting unit such as, for example, stalk dividers, the knife bar, the reel, or other components, it can occur in the case of extremely ripe and dry crops that grains are detached directly from the infructescences of the stalk material and fall to the ground before they are collected by the depositing surface. Grains of this type lying on the ground can no longer be returned to the harvested crop stream and are lost as harvested crop yield. At relatively high traveling speeds of the combine harvester, to which the cutting unit is attached during harvesting, and in greatly weedy stocks, it can occur that the stalks of the harvested crops are not cut off perfectly because the lifting travels of the lifting rods, to which the moving knife blades are fastened, are too long in relation to the traveling speed to be able to cut perfectly, and/or the material bundle which is situated between the moving and the stationary knife blade is too thick for it to be able to be cut off cleanly. Grain losses also then occur here.

Document DE 10 2018 119 326 B3 has disclosed a double knife cutting system, in the case of which not only one lifting rod with the knife blades fastened to it, but rather two lifting rods which, with the knife blades fastened thereto, form an upper and a lower knife are used. The upper and lower knife are driven movably in opposite directions.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The present invention relates to a cutting unit for attachment to a combine harvester with a frame, a knife bar, on which a cutting system is arranged, a depositing surface for depositing the cut stalk material, conveying apparatuses for conveying away the cut stalk material, drive apparatuses for driving the cutting system with a mechanism which is arranged at a location between the side walls of the cutting unit, the mechanism transmitting the drive power via output shafts which are guided outwards out of the mechanism housing on the upper side of the mechanism to drive rocker arms which are connected fixedly to the output shafts for conjoint rotation and are drive-connected to lifting rods which are driven in oscillating movements as part of the cutting system via the drive rocker arms.

It is the object of the present invention to reduce the grain losses of the cutting unit and to improve the cutting and retrieval performance of the cutting unit, even in particularly difficult harvesting conditions.

The object is achieved for a cutting unit of the generic type by a double knife cutting system being configured as a cutting system on the knife bar, in the case of which double knife cutting system a first part of the knife blades present on the cutting unit are fastened to a first knife back, this first part of the knife blades together with the first knife back forming the upper knife, a second part of the knife blades present on the cutting unit being fastened to a second knife back, this second part of the knife blades together with the second knife back forming the lower knife, the upper knife and the lower knife being driven in opposite directions, and, of the drive rocker arms, a first drive rocker arm being drive-connected to the upper knife and a second drive rocker arm being drive-connected to the lower knife.

If a double knife cutting system is used, crop lifters and knife fingers, in which the lifting rod and the knife blades fastened to it are guided, can be dispensed with. Since, in the case of a double knife cutting system, both the upper knife and the lower knife are driven movably in an oscillating manner, their lifting travels are shortened, and the movement speeds can be selected to be lower despite an increased cutting frequency. If the movement speed of the upper and lower knife in the case of half the lifting travel is greater than half as fast as the conventional cutting systems with an oscillating lifting rod, the speed can be greater in the case of harvesting with a cutting unit which is equipped with a double knife cutting system than with a conventional cutting unit, without cutting losses needing to be feared, as a result of which the depositing surface is pushed even more quickly under the falling grains, as a result of which the losses on the cutting unit are once again reduced. This results in the smoother running of the cutting system, as a result of which fewer grains are shaken out of the crops during the cutting of the harvested crops. In addition, the cutting itself is cleaner and smoother, as a result of which the stalks of the harvested material are likewise moved less.

The knife blades of a double knife cutting system can also be mounted at a lower location on the cutting unit than the knife blades of a conventional cutting system with a simple lifting rod because, in the case of the double knife cutting system, crop lifters and knife fingers are not required. The cutting unit itself can be moved more closely to the ground because the knife blades of a double knife cutting system clean themselves and do not get plugged with soil if they make contact with the ground. This results in a longer drop distance of loose grains which can already lead to the loose grains landing on the depositing surface, which is pushed continuously below the cut harvested material during the forward travel of the combine harvester, and not landing on the farmland soil before the depositing surface reaches the drop line of the falling grain either.

Knife bars of a cutting unit are usually driven from the outside via mechanisms which are arranged in the region of the side walls. In the case of the mechanism, which is arranged at least approximately centrally in the cutting unit, one of the drive rocker arms is then drive-connected to the upper knife, and the other drive rocker arm is drive-connected to the lower knife. The mechanism, which is known for a single knife cutting system with split lifting rods, can then also be used in conjunction with a double knife cutting system by way of the attachment in each case of the upper and lower knife to one of the drive rocker arms. Here, the upper and lower knives are not split over the working width of the cutting unit or the working width of a cutting unit part, in which a mechanism is used for driving the double knife cutting system and extending over this working width. In the case of a central drive of the upper and lower knives of the double knife cutting system, this results in a more homogeneous distribution of the drive power over the working width of the upper and lower knives in the cutting unit. The drive shafts and/or hydraulic hoses, by way of which the drive power is conducted from a combine harvester-side drive source through the cutting unit to the mechanism, can then also be arranged closer to the cutting unit center in the cutting unit in the case of a double knife cutting system. If they have to be routed to the outer cutting unit sides, the frame would be loaded with correspondingly higher weights and lever forces. This is avoided by way of a more pronounced centered arrangement of the mechanism.

Here, the mechanism does not have to be geometrically arranged precisely centrally in the cutting unit; a lateral offset with respect to the center is possible. A plurality of mechanisms can also be provided, which in each case, drive a set of upper and lower knives which extend only over a part working width of the cutting unit. Thus, there can be two mechanisms, for example, for a twelve-meter-wide cutting unit, which mechanisms each drive a set of six-meter-wide upper and lower knives, their mechanisms being arranged, for example, at a position which is offset inwards from the side walls by three meters or four meters. The use of the double knives in a twelve-meter-wide cutting unit which has three parts which are connected pivotally to one another, is also possible in each four-meter-wide cutting unit part by way of, in each case, one mechanism which is positioned at least approximately centrally in this cutting unit part and drives the double knives in the associated cutting unit part.

The invention can be implemented both in the case of Draper cutting units and also other cutting units with a rigid depositing surface and conveying apparatuses which sweep over it such as, for example, a conveying worm. In addition, a rotationally driven, height-adjustable, and length-adjustable reel can be provided on the cutting unit as conveying apparatus, which reel is positioned above and over the knife bar, and by way of which reel the cut harvested material is ejected in the direction of the depositing surface. The reel stabilizes and steadies the harvested material in its upper region when it is being cut, and pushes the cut harvested material in the direction of the depositing surface when the cut has taken place, and the harvested material is at this moment in danger of falling onto the farmland soil.

In accordance with one refinement of the invention, the drive rocker arms extend in a plane above the plane of the upper and lower knives from the output shafts in the direction of the upper and lower knives. As a result of the arrangement of the drive train from the mechanism to the upper and lower knives below the plane of the upper and lower knives, the upper and lower knives can be installed into the cutting unit at a very low location at the bottom on the knife bar, and the cutting unit itself maintains a highly flat overall design below the plane of the upper and lower knives, with the result that the upper and lower knives can be guided very close to the ground surface during harvesting operation, and the upper and lower knives are subjected to a lower risk of damage in this installation position because the risk of collision with obstacles is decreased there, and the flow of material is scarcely impeded as a result of this installation position because the drive rocker arms are of highly compact design.

In accordance with one refinement of the invention, the drive train has a portion from the output shaft to the lower knife, in which portion the drive rocker arm engages around regions of the upper knife. This portion supports the upper knife towards the rear in a direction counter to the working direction, and in the process holds the upper and lower knives on one another. Here, the lower knife can be connected fixedly to the lower part of the surrounding portion, with the result that, during the operation of the cutting unit, the lower knife moves in the same direction as the encompassing portion, but the upper knife moves at least temporarily in the opposite direction. The portion can be of strip-shaped configuration, with the result that the supporting and pressing action is set not only in a punctiform manner, but rather over the length of the encompassing portion.

In accordance with one refinement of the invention, the upper knife and the lower knife are held on holding rocker arms which have the same length between their cutting unit-side rotational axis and the rotational axis, via which they are connected to the upper knife or the lower knife, as the drive rocker arms, via which the upper knife and the lower knife are connected to the mechanism. As a result of the identical length of the drive rocker arms, which are used for driving the upper and lower knives, and the holding rocker arms for securing them and, due to this, the identical radius, at which the drive rocker arms and the holding rocker arms rotate about their respective rotational axis, the upper and lower knives move very smoothly. Bending forces are also avoided in the upper and lower knives, which bending forces can occur when drive rocker arms and holding rocker arms with a different length are used.

In accordance with one refinement of the invention, holding rocker arms which hold the upper knife and hold the lower knife are arranged at a bearing point concentrically with respect to one another by way of their respective cutting unit-side rotational axes. In each case, one holding rocker arm for the upper knife and one holding rocker arm for the lower knife form a pair of holding rocker arms which are arranged concentrically with respect to one another. A plurality of pairs of holding rocker arms or all the pairs of holding rocker arms can be provided distributed over the cutting unit width with rotational axes, which are arranged concentrically with respect to one another. The holding forces which act on the upper and lower knives do not differ as a result. One bearing point for mounting the two holding rocker arms is sufficient at every position, at which the upper and lower knives are connected to the cutting unit, as a result of which the construction complexity is reduced. In accordance with a modular system, identical holding rocker arms can be used for securing the upper and lower knives.

In accordance with one refinement of the invention, at their frame-side and/or knife-side end, the holding rocker arms have a buffer element which builds up restoring forces. The buffer element can be, for example, a shaped part made from an elastomeric material such as a natural or synthetic rubber, which shaped part absorbs force peaks, in particular, in the end positions of the associated holding rocker arm and outputs the restoring forces which are built up in the process again when the holding rocker arm moves in the opposite direction again. As a result, the double knife cutting system runs more smoothly and has a longer service life, and the risk of damage by foreign bodies which get clamped between the knife blades is lower because force peaks are absorbed by the buffer elements. Instead of a buffer element made from an elastomeric material, metallic springs can also be used as a buffer element.

In accordance with one refinement of the invention, the knife blades are arranged with a different blade pitch on the upper and lower knife. As a result of the different spacings of the blades, which are arranged on the upper and lower knives, the force peaks which occur between the knife blades as a result of a respective cut at a cutting location are distributed via a revolution of the mechanism to a plurality of angular degrees of a revolution, with the result that a great number of or all the force peaks which occur by cuts on knife pairs are not added at one angular degree. As a result, the drive train is preserved, can be designed for lower forces, and can be operated more smoothly.

In accordance with one refinement of the invention, the cutting unit has a sliding surface, inclined obliquely in the conveying direction of the harvested crops, in the transition region from the knife bar to the depositing surface, the sliding surface being configured as a bar which is connected in a stationary manner to the upper knife. The sliding surface, which is configured as a bar, moves with the oscillating movements of the upper knife if it is connected in a stationary manner to the upper knife. The bar and therefore also the sliding surface perform a shaking movement together with the upper knife during the harvesting work, as a result of which the shaking movement of harvested crops which fall onto the sliding surface are likewise given momentum in the respective movement direction of the upper knife in the case of the contact. Since the upper knife moves very quickly and, in the process, also constantly decreases the movement speed at the stroke position ends and accelerates again and, in the process, also always changes the movement direction, the falling harvested material vibrates on the sliding surface and does not adhere to it.

Since falling harvested material is kept spaced away from the sliding surface in a suspended manner in this way, it can be entrained there more easily by further cutting harvested material which sweeps past the sliding surface and can be conveyed onto the depositing surface. The sliding surface, which is moved together with the upper knife, likewise reduces the grain losses of the cutting unit in the region of the cutting system as a result. The bar can extend in one piece over the entire working width of the cutting unit, but the bar can also be divided into a plurality of parts which are placed next to one another onto the upper knife. The upper knife can also be segmented into parts, it being possible for the segments of the upper knife and the bar parts to be of equally wide configuration. The bar can be particularly sealed towards the upper knife and towards the knife bar, the depositing surface and/or toward adjacent bar parts in the case of a segmented bar, for example, by way of a sealing layer made from an elastomeric material, in order to reduce or even to prevent the passage of harvested material through the slots and joints which are then sealed. The sliding surface, which is moved continuously forwards into the supply of harvested material to be harvested by way of the combine harvester that pushes the lower parts of the cut plants in the working direction of the combine harvester, while the reel conveys the upper regions of the harvested materials in the direction of the depositing surface in the case of optimum setting, with the result that the harvested material inclines towards the depositing surface in a tilting movement and comes to lie on the depositing surface without cutting losses. As a result of the vibration of the sliding surface, the harvested material does not adhere to it, with the result that the momentum of the reel on the cut harvested material in the direction of the depositing surface is not braked by the sliding surface.

In the combination of a double knife cutting system with a sliding surface which is connected in a stationary manner to the upper knife, it is possible for the grain losses in the cutting region of the cutting unit to be reduced, in particular under difficult harvesting conditions. The cut harvested material adheres to a lesser extent to the sliding surface, flows more readily in the direction of the depositing surface, and is overall conveyed away in the direction of the depositing surface of the cutting unit in an improved manner.

In accordance with one refinement of the invention, distributed transversely over the working width, the bar has a number of air outlet openings which are oriented upwards and/or in the direction of the depositing surface. An air stream can exit through the air outlet openings, which air stream captures the cut harvested materials or the harvested material, which is shaken out of the stalks and conveys it in the direction of the depositing surface. The level of losses of the cutting unit can be reduced by way of the air outlet openings.

In accordance with one refinement of the invention, coverings are formed in each case in the bar in the regions, in which rocker arms are situated, which coverings shield the rocker arms against harvested crops and dirt. The joints of the rocker arms are less subject to wear as a result.

In accordance with one refinement of the invention, the cutting unit is of multiple-part configuration, and the bar is of flexible and/or split configuration at the joints between the cutting unit parts. In the case of a multiple-part cutting unit, the frame is not of single-part and rigid configuration, but rather it has a plurality of frame parts which are configured such that they can be moved relative to one another and in each case cover only a part width of the overall working width of the cutting unit with their structural width. The individual frame parts can be adapted to a ground contact in an improved manner in this way. If the bar is of flexible and/or split configuration, at least at the junctures, it does not impede the adaptation movements of the individual frame parts to a changing ground contour, but nevertheless can assist a complete and reliable transfer of the harvested material onto the depositing surface at the junctures, without the risk of grain losses in the transition region between the knife bar and the depositing surface being increased significantly as a result.

In accordance with one refinement of the invention, the upper and lower knives are held over their length in the direction of extent at the free ends of a plurality of supporting arms which are connected to the frame and can be moved with their free ends into height positions which are different from one another. In the case of this method of fastening, the cutting system can be adapted transversely over the working width of the cutting unit in a flexible manner at least approximately to an uneven ground contour, by the free ends of the supporting arms being moved upwards or downwards depending on the surface contour of the farmland soil currently being moved over in the region of the corresponding supporting arm or, in the case of a flat ground surface, remaining in their current position. The supporting arms can be mounted in a pivot bearing, for example, at their frame-side end, or the supporting arms are configured as leaf springs which are fixed on the frame, which makes corresponding spring movements at the free end of the leaf spring possible. In the case of movements of the free ends of the supporting arms, that portion of the upper and lower knives which is held by a corresponding supporting arm and the bar, which is connected fixedly to the upper knife move with the sliding surface upwards or downwards. In the case of lodged grain or other harvested material, which is to be cut close to the ground, this can be satisfactorily undercut and cut away close to the ground, even if ground depressions or elevations are situated in regions within the working width of the cutting unit. Since the bar moves together with the upper knife, the sliding surface also follows the movements, by way of which the upper and lower knives adapt to an uneven floor contour when the cutting unit is moved over the farmland soil during harvesting. In particular, the knife backs of the upper and lower knives are likewise of sufficiently flexible configuration here, with the result that they can be adapted according to the ground contour.

In accordance with one refinement of the invention, the depositing surface is configured on the upwardly pointing side of one or more belt conveyors which are driven in circulation. In the case of a configuration of this type of the cutting unit, it is, in particular, a Draper cutting unit which conveys actively over the entire area of the upper sides of the belt conveyors. Since the circulating belts of the belt conveyors run around lateral deflection rollers in an upper and a lower run and have an unavoidably higher protruding overall height for this reason than, for example, a cutting unit recess formed from sheet metal, it is particularly helpful in the case of Draper cutting units of this type for a vertical offset between the cutting system and the surface of the upper run of the belt conveyor to be overcome by way of a sliding surface which is configured in such a way that it causes grain losses which are as small as possible.

Further features of the invention result from the claims, the figures and the description of the figures. All the features and combinations of features which are mentioned above in the description and the features and combinations of features which are mentioned in the following text in the description of the figures and/or are shown only in the figures can be used not only in the respective specified combination, but rather also in other combinations or else on their own. These and/or other objects, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings. The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
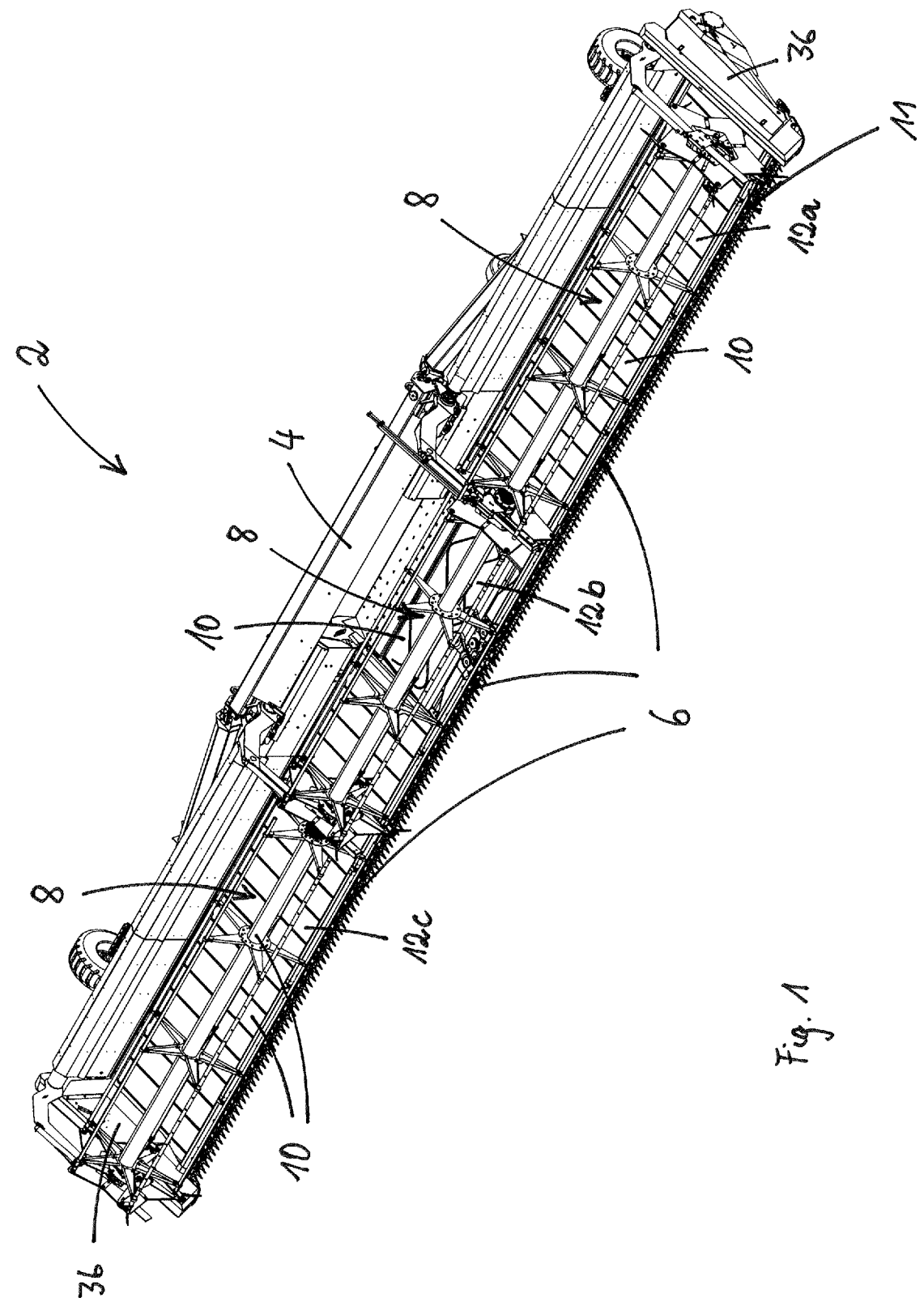
FIG. 1 shows a view of a cutting unit from a view obliquely from the front.

FIG. 1 shows a view of a cutting unit 2 from a view obliquely from the front. The cutting unit 2 is of a multiple-part configuration with a central part and two side parts which can be pivoted in relation to the central part, and has a frame 4, to which the knife bar 6 is connected. The harvested material, which is cut by the knife bar 6 is deposited on the depositing surface 8 and is conveyed away from there by means of one or a plurality of conveying apparatuses 10. The cutting unit 2 has a double knife cutting system 11.

In the exemplary embodiment, the depositing surface 8 is situated on a total of three belt conveyors 12a, 12b, 12c, of which the two lateral belt conveyors 12a, 12c, during the harvesting work, convey the cut harvested material which is deposited on them from the outside to the inside onto the central belt conveyor 12*b*, and the latter conveys the harvested material deposited on it away rearwards in the direction of the feeder house of a combine harvester which is connected to the cutting unit 2. As a result of their method of operation, the belt conveyors 12*a*, 12*b*, and 12*c* not only configure the depositing surface 8, but rather at the same time also conveying apparatuses 10. One example of a further conveying apparatus 10 is the reel which is arranged over and above the knife bar 6 such that it can be driven rotationally. It dips with the reel prongs into the supply of the cereal crops to be harvested during the harvesting work and moves the cut cereal crops in the direction of the depositing surface 8. The cutting unit 2 has a drive apparatus, by way of which a drive force is transmitted to the double knife cutting system 11 with the upper knife 22 and the lower knife 24 and to the conveying apparatuses 10. The side walls 36, which at the same time define the working width of the cutting unit 2 are situated at the lateral ends of the cutting unit 2.

Figure 2:
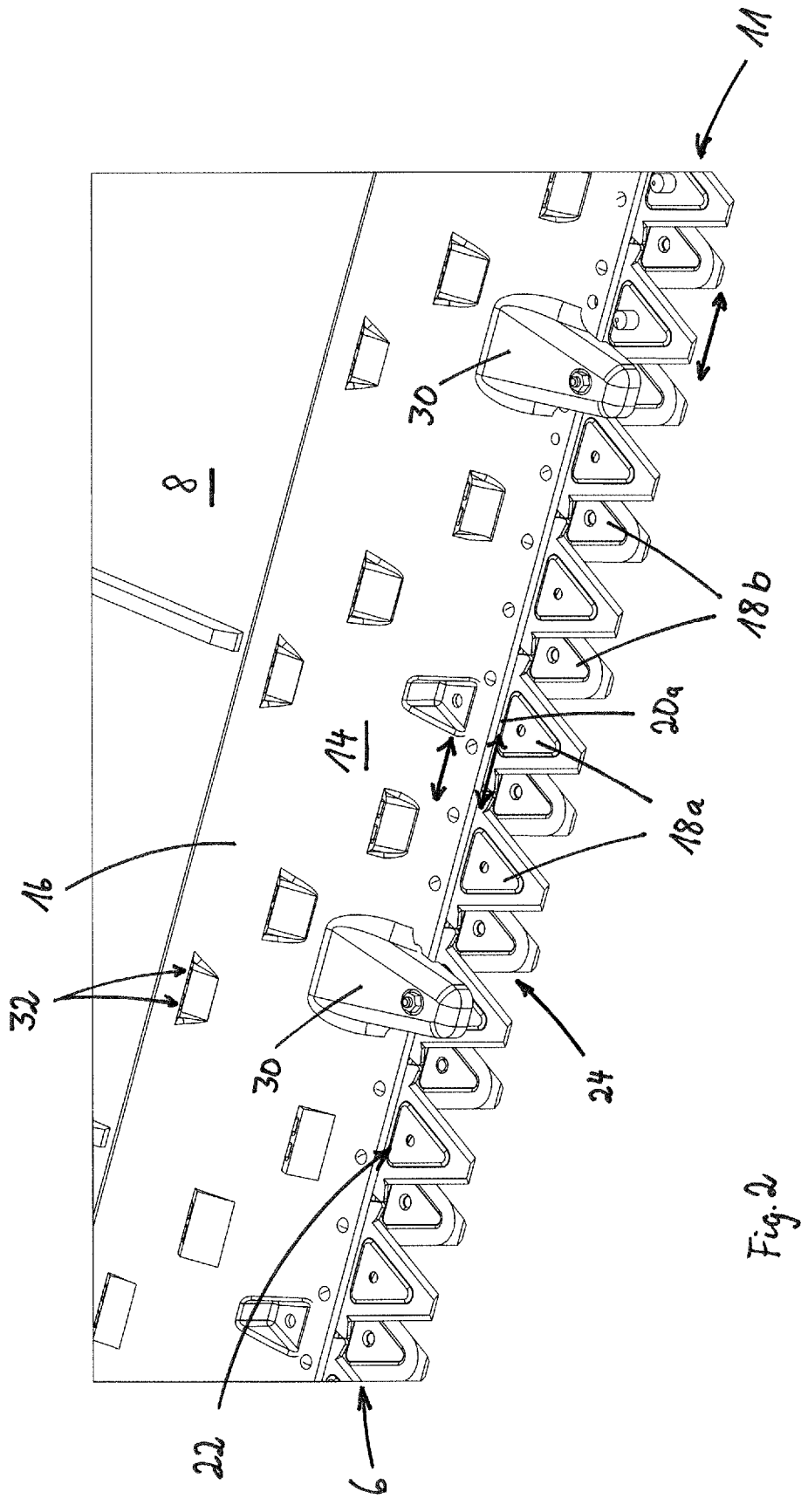
FIG. 2 shows an enlarged detailed view of the double knife cutting system.

FIG. 2 shows an enlarged detailed view of the double knife cutting system 11, which is arranged in the region of the knife bar 6. In the case of the double knife cutting system 11, a first part of the knife blades 18*a* which are present on the cutting unit 2 are fastened to a first knife back 20*a*, and this first part of the knife blades 18*a* forms the upper knife 22 together with the first knife back 20*a*, and a second part of the knife blades 18*b* which are present on the cutting unit 2 are fastened to a second knife back 20*b*, this second part of the knife blades 18*b* forming the lower knife 24 together with the second knife back 20*b*. The upper knife 22 and the lower knife 24 are driven in opposite directions, which results in a type of scissor-like cut in the region of the cutting edges of the knife blades 18*a*, 18*b*, which are moved towards one another, by way of which scissor-like cut the stalks of the harvested material are cut off.

A sliding surface 14 is configured on the cutting unit 2 in the transition region from the double knife cutting system 11 to the depositing surface 8. The sliding surface 14 guides the harvested material over the vertical and/or longitudinal offset between the upper and lower knives 22, 24 and the depositing surface 8. The sliding surface 14 is configured as a bar 16, which is connected in a stationary manner to the upper knife 22. When the upper knife 22 moves to and fro, the bar 16 and, therefore also the sliding surface 14 are correspondingly in motion.

Distributed transversely over the working width of the cutting unit 2, the bar 16 has a number of air outlet openings 32, which are oriented upwards and/or in the direction of the depositing surface 8. Air that exits from the air outlet openings 32 can capture harvested material which is falling down in the region of the sliding surface 14 and can blow it in the direction of the depositing surface 8, with the result that this harvested material does not fall onto the farmland soil in front of the knife bar 6 and is not lost.

Moreover, in the regions, in which drive rocker arms 34 and holding rocker arms 40 are respectively situated, the bar 16 can also in each case have shaped coverings 30, which shield the drive rocker arm 34 and holding rocker arms 40 against harvested material and dirt. The coverings 30 can be configured in a manner which is formed in one part in the bar 16, as a result of which the assembly is simplified and joints and edges are avoided, at which harvested material might get jammed and might build up to form material clumps.

Figure 3:
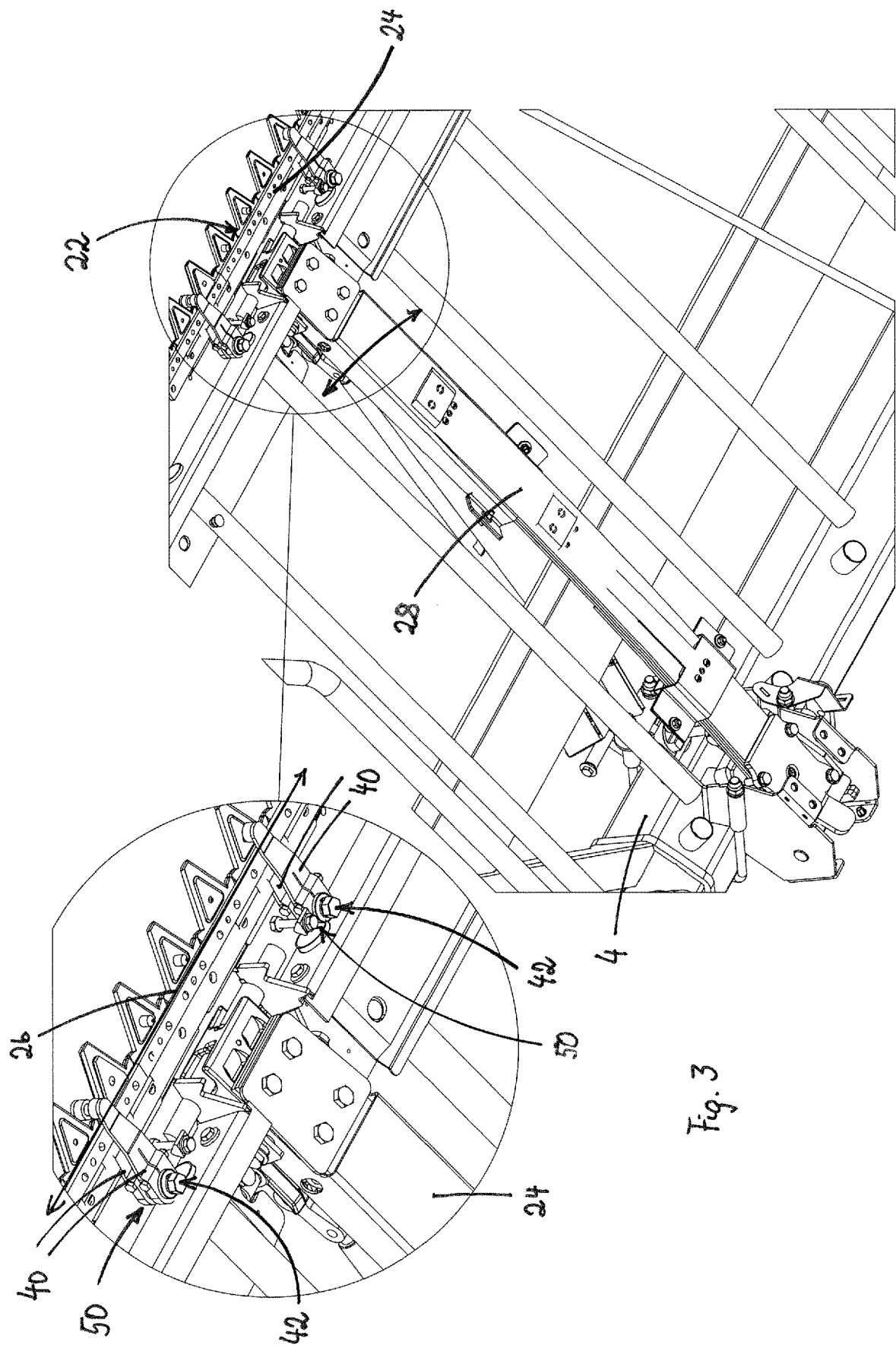
FIG. 3 shows the upper and lower knives, which are held at the free ends by a plurality of supporting arms that are connected to the frame.

It is shown in FIG. 3 that the upper and lower knives 22, 24 are held over their lengths in the direction of extent 26 at free ends by a plurality of supporting arms 28, which are connected to the frame 4 and can be moved with their free ends into vertical positions which are different from one another. FIG. 3 shows by way of example one of the supporting arms 28 which is configured in the exemplary embodiment as a leaf spring. The mobility of the supporting arm 28 is indicated by way of a corresponding double arrow in the region of its free end. As a result of the movable height securing of the upper and lower knives 22, 24, they can be adapted in a flexible manner to an uneven ground contour during the harvesting work of the harvesting machine. FIG. 3 also shows that the holding rocker arms 40, which hold the upper knife 22 and hold the lower knife 24, are arranged at a bearing point 50 with their respective cutting unit-side rotational axes 42 concentric with respect to one another.

Figure 4:
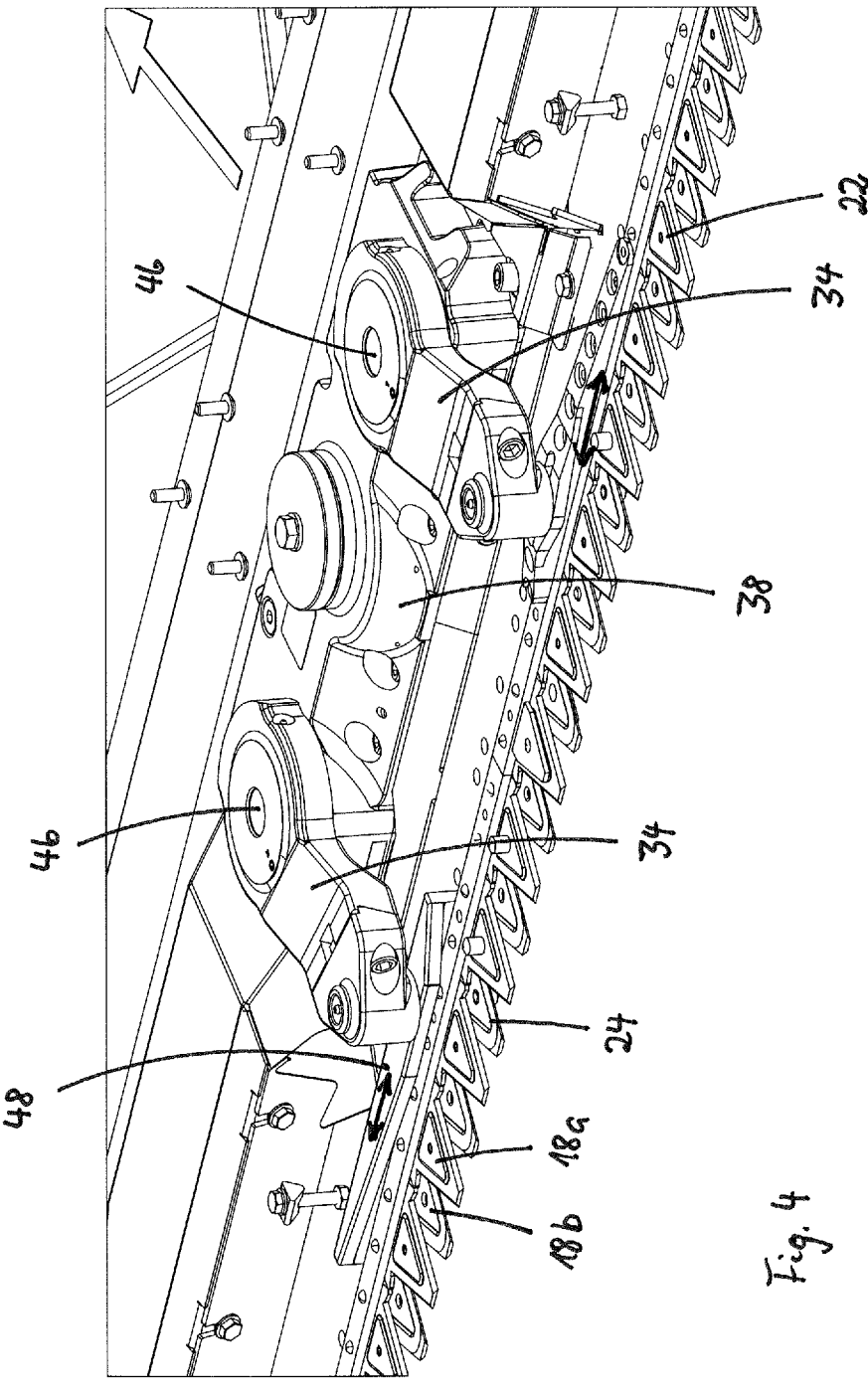
FIG. 4 shows an enlarged view of that region of the knife bar, in which a mechanism is arranged.

FIG. 4 shows an enlarged view of the region of the knife bar 6, in which a mechanism 38 is arranged. The mechanism 38 is arranged in the cutting unit 2 at a location between the side walls 36 of the cutting unit 2, preferably at least approximately centrally between the side walls 34 in the case of only one mechanism 38 in the cutting unit 2. In the mechanism 38, a rotating drive rotational speed which is introduced by a drive shaft into the mechanism 38 is converted into an oscillating to and fro movement of the drive rocker arms 34, to which the upper knife 22 and the lower knife 24 of the double knife cutting system 11 are drive-connected. It can be seen in FIG. 4 that the output shafts 46 are guided out of the mechanism housing to the outside on the upper side of the mechanism 38 in order to drive the drive rocker arms 34. There, they are connected to the drive rocker arms 34 which extend from a plane above the plane of the upper and lower knives 22, 24 from the output shafts 46 in the direction of the upper and lower knives 22, 24. The drive rocker arms 34 push the upper and lower knives 22, 24 to and fro, as a result of which the knife blades 18*a*, 18*b* cut harvested material which is situated between the knife blades 18*a*, 18*b*. In this way, the two knives 22, 24 can be driven in an oscillating manner by way of only one mechanism 38. The balance of the cutting unit 2 about its longitudinal center axis is maintained in full by way of the at least approximately central arrangement of the mechanism 38. In addition, the lateral edges of the cutting unit 2 are relieved of the weight of the mechanism 38 and the associated drive train to the mechanism 38, which has a considerably relieving effect on the overall construction, in particular, in the case of relatively great working widths of the cutting unit 2 of more than 8 m, because, as a result, the frame 4 can also be of lighter configuration. FIG. 4 also shows that the drive train has a portion 48 from the output shaft 46 to the lower knife 24, in which portion 48 the drive rocker arm 34 rocker arm 46 engages in regions around the upper knife 22.

Figure 5:
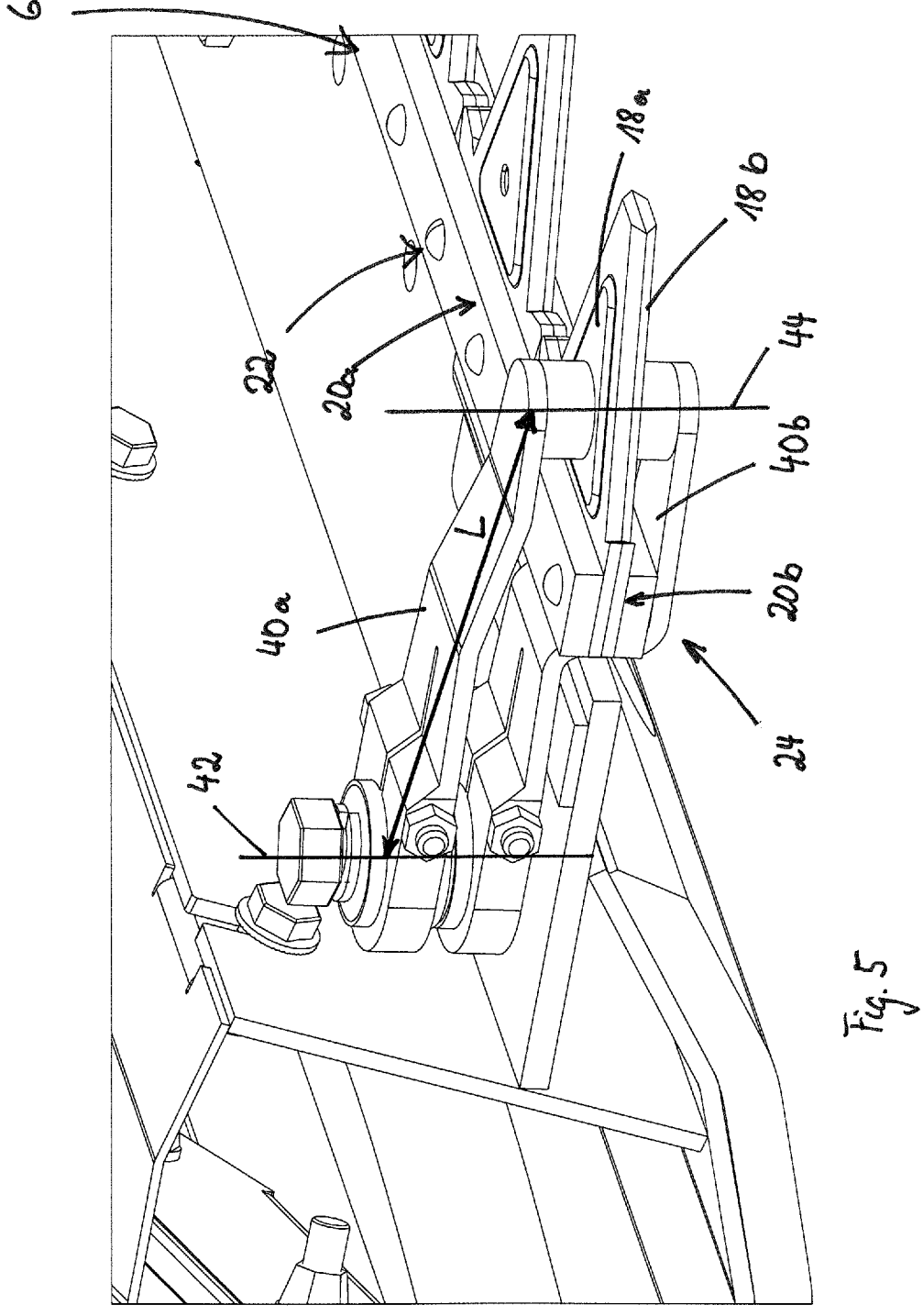
FIG. 5 shows a sectional view through the region of the knife bar.

FIG. 5 shows a sectional view through the region of the knife bar 6. The upper knife 22 and the lower knife 24 are held there on holding rocker arms 40, which, between their cutting unit-side rotational axis 42 and the rotational axis 44, by which they are connected to the upper knife 22 or the lower knife 24, have the same length L as the drive rocker arms 34, via which the upper knife 22 and the lower knife 24 are connected to the mechanism 38. The holding rocker arms 40*a*, 40*b*, which hold the upper knife 22 and the lower knife 24, are arranged with their respective cutting unit-side rotational axes 42 concentrically with respect to one another.

The invention is not restricted to the above exemplary embodiment. It does not pose any difficulties to a person skilled in the art to modify the exemplary embodiment in a way which appears suitable to them, in order to adapt it to a specific application.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| 2 | Cutting unit |
|---|---|
| 4 | Frame |
| 6 | Knife bar |
| 8 | Depositing surface |
| 10 | Conveying apparatus |
| 11 | Double knife cutting system |
| 12a | First lateral belt conveyor |
| 12b | Central belt conveyor |
| 12c | Second lateral belt conveyor |
| 14 | Sliding surface |
| 16 | Bar |
| 18a | First part of the knife blades |
| 18b | Second part of the knife blades |
| 20a | First knife back |
| 20b | Second knife back |
| 22 | Upper knife |
| 24 | Lower knife |
| 26 | Direction of extent |
| 28 | Supporting arm |
| 30 | Covering |
| 32 | Air outlet opening |
| 34 | Driver rocker arm (mechanism) |
| 36 | Side wall |
| 38 | Mechanism |
| 40 | Holding rocker arm (holder) (broken down further into rocker arm components 40a and 40b in FIG. 5) |
| 42 | Cutting unit-side rotational axis |
| 44 | Knife-side rotational axis |
| 46 | Output shaft |
| 48 | Portion (broken down further into portions 48a and 48b in FIG. 5) |
| 50 | Bearing point |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A cutting unit (2) for attachment to a combine harvester which comprises a frame (4), a knife bar (6), on which a cutting system is arranged, a depositing surface (8) for depositing cut stalk material, conveying apparatuses (10) for conveying away the cut stalk material, drive apparatuses for driving the cutting system with a mechanism (38) which is arranged at a location between side walls (36) of the cutting unit (2), the mechanism (38) transmitting drive power via output shafts (46) which are guided outwards out of a mechanism housing on an upper side of the mechanism (38) to drive rocker arms (34) which are connected fixedly to the output shafts (46) for conjoint rotation and are drive-connected to lifting rods which are driven in oscillating movements as part of the cutting system via the drive rocker arms (34), further including a double knife cutting system (11) that is configured as the cutting system on the knife bar (6), in the case of which double knife cutting system (11) a first part of knife blades (18a) present on the cutting unit (2) are fastened to a first knife back (20a), this first part of knife blades (18a) together with the first knife back (20a) forming an upper knife (22), a second part of the knife blades (18b) present on the cutting unit (2) being fastened to a second knife back (20b), this second part of the knife blades (18b) together with the second knife back (20b) forming the lower knife (24), the upper knife (22) and a lower knife (24) being driven in opposite directions, and, of the drive rocker arms (34), a first drive rocker arm (34) being drive-connected to the upper knife (22) and a second drive rocker arm (34) being drive-connected to the lower knife (24).

2. The cutting unit (2) for attachment to a combine harvester according to claim 1, wherein the drive rocker arms (34) extend in a plane above a plane of the upper knife (22) and the lower knife (24) from the output shafts (46) in the directions of the upper knife (22) and lower knife (24).

3. The cutting unit (2) for attachment to a combine harvester according to claim 1, wherein a drive train has a portion (48) from the output shaft (46) to the lower knife (24), in which portion (48) first drive rocker arm (34) engages around regions of the upper knife (22).

4. The cutting unit (2) for attachment to a combine harvester according to claim 1, wherein the upper knife (22) and the lower knife (24) are held on holding rocker arms (40) which have a same length between a cutting unit-side rotational axis (42) and a rotational axis (44), via which they are connected to the upper knife (22) or the lower knife (24), as the drive rocker arms (34), via which the upper knife (22) and the lower knife (24) are connected to the mechanism (38).

5. The cutting unit (2) for attachment to a combine harvester according to claim 1, wherein holding rocker arms (40), which hold the upper knife (22) and hold the lower knife (24) are arranged at a bearing point (50) concentrically with respect to one another by way of respective cutting unit-side rotational axes (42).

6. The cutting unit (2) for attachment to a combine harvester according to claim 5, wherein the holding rocker arms (40), have a buffer element that builds up restoring forces a frame-side and/or knife-side end.

7. The cutting unit (2) for attachment to a combine harvester according to claim 1, wherein the knife blades (18*a*, 18*b*) for the upper knife (22) and the lower knife (24) are arranged with different spacings between the knife blades (18*a*, 18*b*) for the upper knife (22) and the lower knife (24).

8. The cutting unit (2) for attachment to a combine harvester according to claim 1, wherein the cutting unit (2) has a sliding surface (14), inclined obliquely in the conveying direction of the harvested crops, in a transition region from the knife bar (6) to the depositing surface (8), the sliding surface (14) being configured as a bar (16) which is connected in a stationary manner to the upper knife (22).

9. The cutting unit (2) for attachment to a combine harvester according to claim 8, wherein the bar (16) has a number of air outlet openings (32) which are oriented upwards and/or in the direction of the depositing surface (8) distributed transversely over a working width.

10. The cutting unit (2) for attachment to a combine harvester according to claim 8, further comprising coverings (30) that are formed in the bar (16) in regions, in which the drive rocker arms (34) and holding rocker arms (40) are situated, which coverings (30) shield the drive rocker arms (34) and the holding rocker arms (40) against harvested crops and dirt.

11. The cutting unit (2) for attachment to a combine harvester according to claim 8, wherein the cutting unit (2) is of multiple-part configuration, and the bar (16) is of flexible and/or split configuration at joints between cutting unit parts.

12. The cutting unit (2) for attachment to a combine harvester according to claim 1, wherein the upper and lower knives (22, 24) are held over their length in a direction of extent (26) at free ends of a plurality of supporting arms (28) which are connected to the frame (4) whose free ends are movable into height positions which are different from one another.

13. The cutting unit (2) for attachment to a combine harvester according to claim 1, wherein the depositing surface (8) is configured on an upwardly pointing side of one or more belt conveyors (12) which are driven in circulation.

* * * * *